Jan. 24, 1956
L. CHURGIN ET AL
2,731,873
HAND SURVEYING INSTRUMENT
Filed Jan. 24, 1952
2 Sheets-Sheet 1
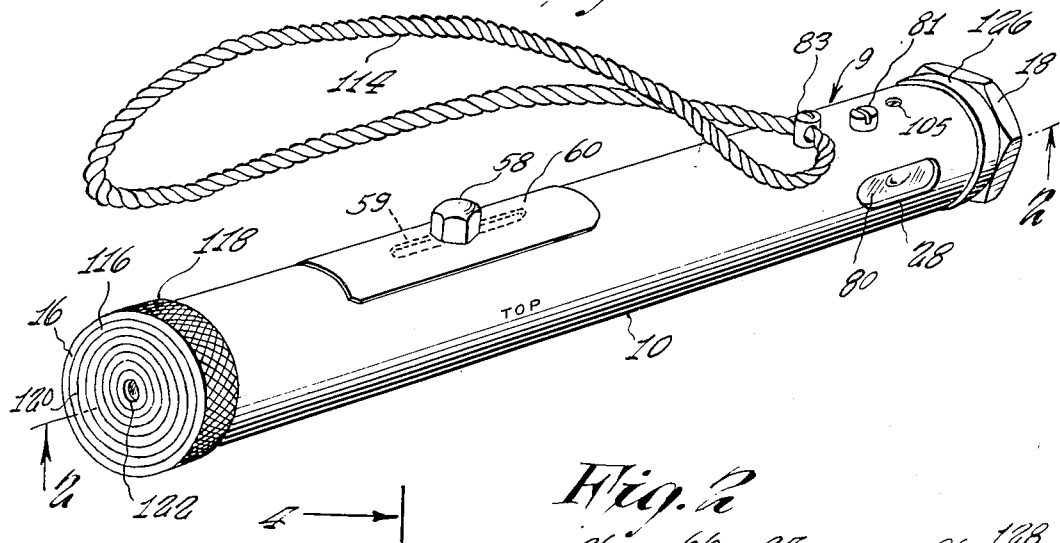
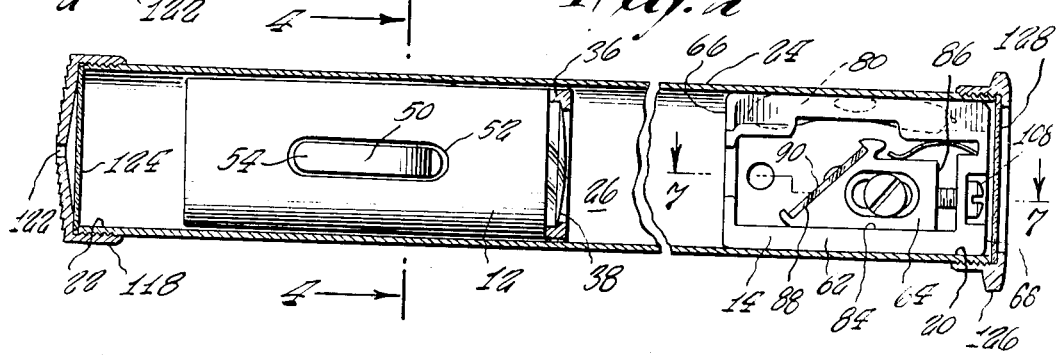
INVENTOR.
Leopold Churgin
Donald M. Grundberg

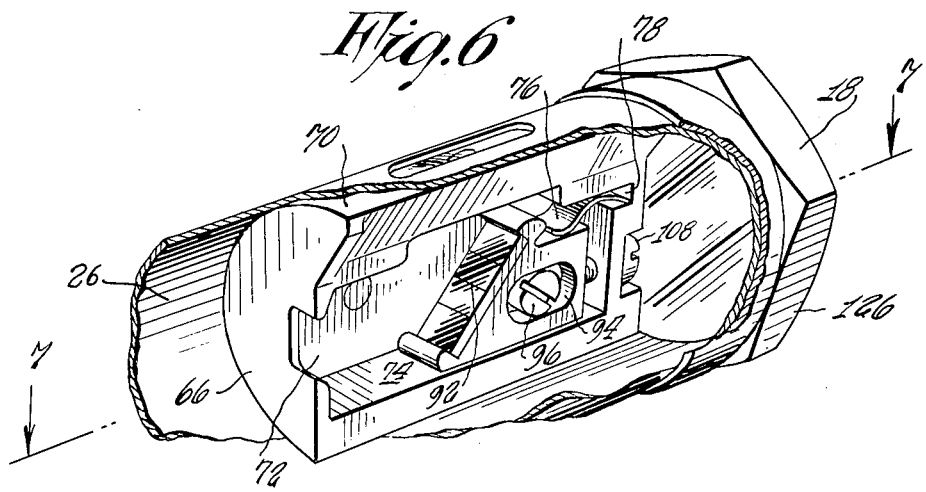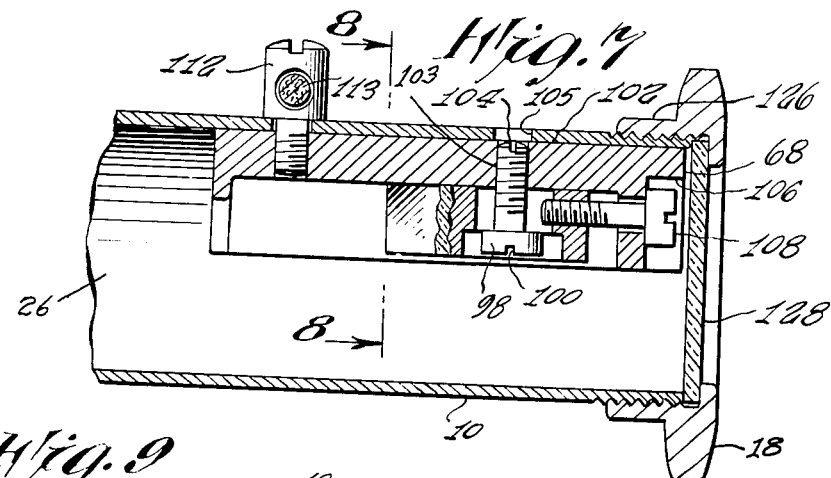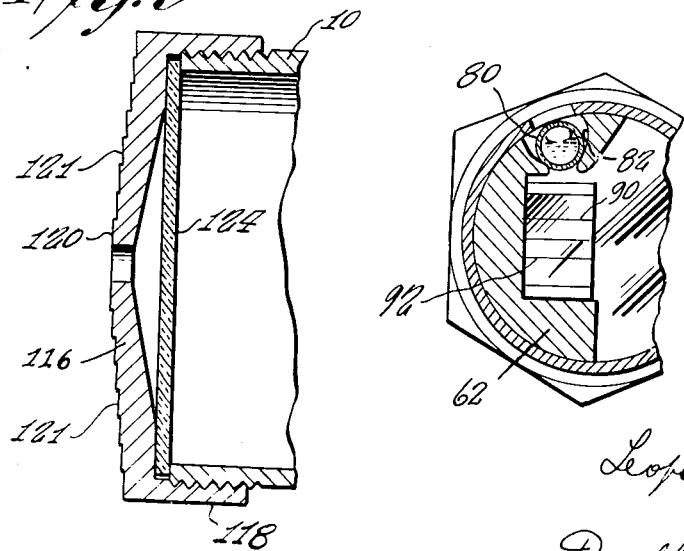

ly indicated by reference character 9, comprises broadly

United States Patent Office 2,731,873
Patented Jan. 24, 1956

2,731,873

HAND SURVEYING INSTRUMENT

Leopold Churgin, New York, N. Y., and Donald N. Grundberg, Stoneham, Mass., assignors to C. L. Berger & Sons, Inc., Boston, Mass., a corporation of Massachusetts Application January 24, 1952, Serial No. 268,062

2 Claims. (Cl. 88—2.3)

This invention relates generally to surveying instruments, and more particularly to an improved form of hand level, commonly known in the art as a Locke level. The invention lies in specific structural improvements which permit not only greater simplicity in the manufacturing process, but also facilitate the use of the device.

It is among the principal objects of the present invention to provide Locke level structure in which the focusing tube element disposed within the main tube element may be easily reciprocated with a minimum of effort on the part of the user.

Another object of the invention lies in the provision of Locke level structure in which the internal focusing tube element is mounted for reciprocation within the main tube element by means including a resilient component.

Another object of the invention herein lies in the provision of Locke level structure in which sliding fits may be of relatively wide tolerances, while yet obtaining a smooth sliding action between the focusing tube element and the outer or main tube element.

Still another object of the invention lies in the provision of a Locke level having an improved leveling element incorporating an adjustable mirror.

A further object of the invention lies in the provision of improved leveling element structure having mirror adjustment means which may be operated without disassembling the entire instrument.

A feature of the invention lies in the provision of Locke level structure which is substantially dustproof after assembly.

Another feature of the invention lies in the provision of Locke level structure having the above described features, in which the cost of fabrication may be of a relatively low order, with consequent wide sale, distribution and use.

Another object of the invention lies in the provision of Locke level structure possessing the above-mentioned advantages which may be of exceptionally sturdy structure, thus permitting a relatively long, trouble-free, useful life.

These objects and features, as well as other incidental ends and advantages, will become more clearly apparent during the course of the following disclosure, and be pointed out in the appended claims.

On the drawing, to which reference will be made in the specification, similar reference characters have been employed to designate corresponding parts throughout the several views.

Figure 1 is a view in perspective of an embodiment of the invention.

Figure 2 is a longitudinal central sectional view as seen from the plane 2—2 on Figure 1.

Figure 3 is a view in perspective showing the focusing tube element which comprises a part of the embodiment.

Figure 4 is a fragmentary enlarged vertical sectional view as seen from the plane 4—4 on Figure 2.

Figure 5 is an elevational view of the focusing tube element shown on Figure 3.

Figure 6 is an enlarged fragmentary view in perspective showing the leveling element which comprises another part of the embodiment.

Figure 7 is an enlarged fragmentary central longitudinal sectional view as seen from the plane 7—7 on Figure 6.

Figure 8 is a fragmentary vertical transverse sectional view as seen from the plane 8—8 on Figure 7.

Figure 9 is an enlarged fragmentary vertical central sectional view showing the extreme left hand portion of Figure 2.

In accordance with the invention, the device, generally indicated by reference character 9, comprises broadly a main tube element 10, a focusing tube element 12, a leveling element 14, an eye piece element 16 and a cover element 18.

The main tube element 10 is preferably of hollow cylindrical configuration and formed from brass or other suitable material. It includes a forward end 20, a rearward end 22, both of which are threaded to receive the elements 16 and 18 when the device is fully assembled. The outer surface 24 may be painted or otherwise protected, if desired, while the inner surface 26 is preferably smooth and otherwise untreated. A bubble tube slot 28 is formed in the tube at points near the forward end 20 to permit light to fall upon the bubble tube 80 disposed therebeneath.

The focusing tube element 12 includes a hollow cylinder 30 having forward and rearward terminals 34 and 32, respectively. The outside diameter of the cylinder 30 is substantially less than the internal diameter of the main tube element 10, so as to permit a sliding fit. The lens mounting 36 provides means for supporting a lens 38 which is of a convex type, the same serving to magnify the image of the bubble formed in the bubble tube 80. A pair of forward alignment pads 40 and 42 and a pair of rearward alignment pads 44 and 46 are formed integrally upon the outer surface of the cylinder 30 as shown on Figures 3 and 5. These pads extend several thousandths of an inch outwardly of the outer surface of the cylinder 30 and are disposed approximately 120° apart from each other upon the curved surface. The amount of clearance between the main tube element 10 and the tube 30 is shown to an exaggerated degree on the drawing for purposes of clarity. Disposed approximately 120° from the axes of the pads 40–46 is an oval shaped groove 48 in which there is disposed a resilient leaf spring 50. The spring 50 includes a forwardly disposed terminal 52, and a rearwardly disposed terminal 54, between which is disposed a central raised portion 56 adapted to bear against the inner surface of the main tube element 10. Thus, when fully assembled, the cylinder 30 rides upon the inner surface of the element 10 at five points, namely the four alignment pads 40–46 and the portion 56 of the leaf spring 50. Since the pads are symmetrically located, there is a minimum of friction involved in moving the cylinder 30 with respect to the element 10. Additionally, there is eliminated the necessity of machining the outer surface of the cylinder 30 to close tolerances with respect to the inner surface of the element 10. It is thus possible to materially reduce the machining involved in the fitting of these two parts.

The cylinder 30 is moved with respect to the element 10 by means of a focussing knob in the form of an adjusting nut 58 which extends through a slot 59 (see Fig. 1) in the element 10. This movement is facilitated by a curved guide plate 60 which rides along the outer surface 24 of the same.

The leveling element includes a fixed supporting member 62 upon which the mirror positioning member 64 is slidably mounted.

The fixed member 62 is preferably in the form of a die casting and is of generally irregular configuration. It includes a rearwardly disposed surface 66, a forwardly disposed surface 68, an outer cylindrical surface 70, the radius of which substantially equals that of the inner surface 26, and a large irregularly shaped channel 72. The lower surface 74 of the channel 72 is planar, to provide a support for the sliding of the mirror supporting member 64 thereover. The member 64 is urged to contact the surface 74 by a small leaf spring 76 which is maintained in a groove 78. A bubble tube 80 which may be of conventional design is maintained in a recess 82 (see Figure 8), the same being positively maintained in position when the member 62 is fastened to the tube element 10 by means of screws 81 and 83.

The mirror positioning member 64 is generally trapezoidal in configuration and includes a lower surface 84, a forwardly disposed vertical surface 86, an angularly disposed supporting surface 88 upon which there is mounted a mirror 90 having the usual index lines 92. A countersunk adjusting slot 94 cooperating with a set screw 96 provides means for locking the position of the mirror supporting member 64 with respect to the fixed member 62.

The set screw 96 includes a head portion 98 having a screw driver engagement slot 100, as well as a threaded shaft portion 102 having a second screw driver engaging slot 104. The same is threadedly engaged in the hole 103 within the opening 105 in the element 10. A recess 106 accommodates the head of an adjusting screw 108, the same permitting fine adjustment of the mirror supporting member 64 with respect to the bubble tube 80.

During the assembly of the device, the mirror positioning member 64 may be mounted within the fixed member 62 by means of the set screw 96, the slot 100 being employed to tighten the same. When the entire leveling element 14 is installed within the tube element 10, the slot 100 can no longer be conveniently reached. Subsequent adjustment is made by loosening the screw 96, using the slot 104. Any adjustments made after assembly may be accomplished by removing the cover element 18 to permit access to the screw 108, the screw 96 being first loosened from outside the element 10 to permit relative movement between the memberes 62 and 64.

The eye piece element 16 includes a cap member 116 (see Figure 9). The same is threadedly engageable upon the rearward end of the tube element 10 and includes an annular knurled surface 118 as well as a stepped machined surface 120. As is the case with most optical instruments, it is desirable that the eye piece have other than a truly planar surface to avoid undesirable reflections. Thus the surface 120 is made up of a plurality of stepped circular surfaces 121, each step being approximately five one thousandths (.005) inch from the succeeding step. This arrangement permits all of the surfaces 121 to be machined simultaneously, using a tool (not shown) having a stepped cutting edge. A transparent dust sealing member of glass or synthetic resin 124 prevents entry of contaminating material through the viewing opening 122.

The cover element 18 is of similar structure including a threaded collar 126 which serves to maintain in position a transparent protective cover 128, preferably formed from planar glass or other similar material.

If desired, the screw 83 may be formed as shown on Figures 1 and 3 to include a large head having a transverse orifice 113 therein. A lanyard 114 is engaged in this orifice to provide means for carrying the entire device 9 about the neck of the user, thus avoiding possibility of damage while carrying.

It may thus be seen that we have invented novel and highly useful improvements in Locke level structure, permitting the device to be simply manufactured and easily used. The device, unlike similar surveying instruments, may be maintained in a substantially dust-tight condition. Its adjustments may be made to fine degrees, and with a precision normally found only in far more expensive surveying instruments. The device includes a leveling element which may be removed from the main tube element, although critical adjustments may be made without so doing, should the same become necessary after installation. The device is sturdy and durable, and will withstand much rough handling without adverse effects.

We wish it to be understood that we do not consider the invention limited to the exact details of structure shown and set forth in this specification, for obvious modifications will occur to those skilled in the art to which the present invention pertains.

We claim:

1. A leveling element for use in a surveying instrument, including a fixed member disposable within the main optical tube of said surveying instrument and fixedly supporting a bubble tube; a mirror positioning member axially and slidably disposed with respect to said fixed member, and to said bubble tube; and means to fix the positioning of said mirror with respect to said fixed member in operative alignment with said bubble tube, said means including a locking screw engagable with a slot in said mirror positioning member and a threaded opening in said fixed member; said screw including a head portion and threaded shaft portion, said portion having a slot for engagement with a screw driver, said threaded shaft portion having a second engagement slot engageable with a second screw driver.

2. A leveling element for use in a surveying instrument, including a fixed member disposable within the main optical tube of said surveying instrument and fixedly supporting a bubble tube; a mirror positioning member axially and slidably disposed with respect to said fixed member, and to said bubble tube; and means to fix the positioning of said mirror with respect to said fixed member in operative alignment with said bubble tube, said means including a locking screw engagable with a slot in said mirror positioning member and a threaded opening in said fixed member; said screw including a head portion and a threaded shaft portion, said portion having first means for engagement with a tool, said threaded shaft portion having second means enegageable with a second tool.

References Cited in the file of this patent

UNITED STATES PATENTS

| | | |
|---|---|---|
| 1,086,124 | Beebe | Feb. 3, 1914 |
| 1,094,531 | Coash | Apr. 28, 1914 |
| 1,115,026 | Saegmuller | Oct. 27, 1914 |
| 1,267,596 | Schleinzer | May 28, 1918 |
| 1,558,367 | Johnson | Oct. 20, 1925 |
| 1,682,034 | Burmister | Aug. 28, 1928 |
| 1,696,508 | Thornburn | Dec. 25, 1928 |
| 1,705,146 | Willson | Mar. 12, 1929 |
| 1,714,827 | Torka et al. | May 28, 1929 |
| 2,370,257 | Peck | Feb. 27, 1945 |

FOREIGN PATENTS

| | | |
|---|---|---|
| 788,179 | France | July 22, 1935 |